2,711,413
Patented June 21, 1955

2,711,413

5-PHENYL-5(3-THIENYL)-HYDANTOIN AND SALTS THEREOF

Ernest E. Campaigne, Bloomington, Ind., assignor to Indiana University Foundation, Monroe County, Ind., a corporation of Indiana No Drawing. Application November 19, 1952, Serial No. 321,500

3 Claims. (Cl. 260—309.5)

This invention relates to a new compound, 5-phenyl-5-(3-thienyl)hydantoin, to non-toxic salts thereof, and to a method for its preparation.

My new compound has anticonvulsant properties and has surprisingly been found to be considerably more active and less toxic than the isomeric 5-phenyl-5-(2-thienyl)hydantoin when tested in rats by the electroshock method. For example, 5-phenyl-5-(3-thienyl)hydantoin has a minimum effective dose of 10 mg. per kg. of body weight and a minimum toxic dose of 250 mg. per kg. Under the same conditions 5-phenyl-5-(2-thienyl)hydantoin has a minimum effective does of 18.5 mg. per kg. and a minimum toxic dose of 75 mg. per kg. Therefore, 5-phenyl-5-(3-thienyl)hydantoin has a therapeutic index of 25 whereas 5-phenyl-5-(2-thienyl)hydantoin has a therapeutic index of 4.

5-phenyl-5-(3-thienyl)hydantoin is prepared by heating phenyl 3-thienyl ketone with an excess of an alkali metal cyanide and an excess of ammonium carbonate in an inert solvent. The phenyl 3-thienyl ketone required in this process is readily prepared from the reaction of phenylmagnesium halide and 3-cyanothiophene.

5-phenyl-5-(3-thienyl)hydantoin is useful per se as an anticonvulsant. However, this compound, like other hydantoins unsubstituted in the 3-position, possesses an acidic hydrogen and is readily converted to salts by reaction with inorganic or organic bases, and those salts whose cations are non-toxic to the animal organism are likewise useful as anticonvulsants. Particularly useful are the salts derived from alkali metal and alkali earth metal hydroxides, such as the sodium, potassium and calcium salts; the ammonium salt; and salts derived from organic amines and diamines, such as the ethanolamine, diethanolamine and ethylenediamine salts.

The following example will further illustrate the invention.

EXAMPLE (a) Phenyl 3-thienyl ketone: A solution of 47.1 g. (0.3 mole) of freshly distilled bromobenzene in 50 cc. of dry ether was gradually added to 5.0 g. (0.206 mole) of magnesium filings (30 mesh) under 250 cc. of dry ether. After the preparation of the Grignard reagent was complete, there was added slowly, with stirring, 7.2 g. (0.066 mole) of 3-cyanothiophene in 50 cc. of dry ether at such a rate as to keep the solution refluxing slowly. The refluxing continued without outside heating for an hour after the addition of the 3-cyanothiophene was completed, and then the mixture was heated to continue the refluxing for another three hours and allowed to stand overnight. The mixture was hydrolyzed by the addition of flaked ice, followed by dilute sulfuric acid until the basic salts had dissolved. The remaining yellow solid was collected by filtration and shaken with 6N sodium hydroxide solution and ether. The ether layer was separated, the water layer was extracted twice with ether, and the combined ether extracts were washed with water and dried over anhydrous magnesium sulfate. The ether solution was concentrated and the residue was distilled. After being cooled in an acetone-dry ice bath the product crystallized from methanol giving 6.9 g. (56%) of phenyl 3-thienyl ketone, M. P. 63–64° C.

Anal.—Calcd. for $C_{11}H_8OS$: S, 17.03. Found: S, 17.33.

The semicarbazone of phenyl 3-thienyl ketone, prepared from 0.2 g. of ketone, 0.2 g. of semicarbazide hydrochloride and 0.3 g. of sodium acetate in dilute ethanol solution, was obtained as white needles, M. P. 178–179° C., when recrystallized from dilute ethanol.

The 2,4-dinitrophenylhydrazone of phenyl 3-thienyl ketone prepared by heating 0.2 g. of ketone, 0.2 g. of dinitrophenylhydrazine and 0.2 cc. of concentrated hydrochloric acid in 10 cc. of 95% ethyl alcohol, was obtained as orange needles, M. P. 211–211.5° C., when recrystallized from chloroform.

(b) 5-phenyl-5-(3-thienyl)hydantoin: A mixture of 4.6 g. (0.0245 mole) of phenyl 3-thienyl ketone, 4.8 g. (0.0735 mole) of potassium cyanide and 9.4 g. (0.0980 mole) of ammonium carbonate in 100 cc. of 60% ethyl alcohol was heated in a sealed tube in a Carius furnace at 110° C. for ninety hours. The tube was cooled and opened, and the reaction mixture was carefully poured into 200 cc. of water. The mixture was then acidified under an efficient hood and the resulting precipitate was collected by filtration. The solid was dissolved in 5% sodium hydroxide solution, and the alkaline solution containing the sodium salt of 5-phenyl-5-(3-thienyl)hydantoin was acidified with dilute hydrochloric acid. The solid product was collected by filtration and recrystallized from dilute acetic acid, using activated charcoal for decolorizing purposes, to give 4.2 g. (67%) of 5-phenyl-5-(3-thienyl)hydantoin, M. P. 254° C.

Anal.—Calcd. for $C_{13}H_{10}O_2N_2S$: S, 12.41; N, 10.85. Found: S, 12.44; N, 11.57.

I claim:

1. A member of the group consisting of 5-phenyl-5-(3-thienyl)hydantoin having the chemical formula

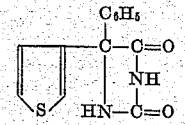

and non-toxic salts thereof.

2. 5-phenyl-5-(3-thienyl)hydantoin having the chemical formula

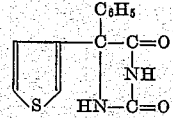

3. In the process for preparing 5-phenyl-5-(3-thienyl)-hydantoin, the step which comprises heating phenyl 3-thienyl ketone with an excess of an alkali metal cyanide and an excess of ammonium carbonate in an inert solvent.

References Cited in the file of this patent

UNITED STATES PATENTS 2,366,221    Spurlock _____ Jan. 2, 1945

OTHER REFERENCES

Chemical Abstracts, vol. 41, p. 7668$^h$ citing Tschoubar, Ind. parfum, vol. 2, pp. 193–5 (1947).